US011809543B2

(12) United States Patent
Lattin et al.

(10) Patent No.: US 11,809,543 B2
(45) Date of Patent: Nov. 7, 2023

(54) VALIDATION OF SOFTWARE RESIDING ON REMOTE COMPUTING DEVICES

(71) Applicant: INTEGRITY Security Services LLC, Santa Barbara, CA (US)

(72) Inventors: William L. Lattin, Los Altos, CA (US); Jimmy R. Upton, Santa Barbara, CA (US)

(73) Assignee: INTEGRITY SECURITY SERVICES LLC, Santa Barbara, CA (US)

( * ) Notice: Subject to any disclaimer, the term of this patent is extended or adjusted under 35 U.S.C. 154(b) by 200 days.

(21) Appl. No.: 17/503,740

(22) Filed: Oct. 18, 2021

(65) Prior Publication Data
US 2022/0035902 A1    Feb. 3, 2022

Related U.S. Application Data

(62) Division of application No. 17/099,025, filed on Nov. 16, 2020, now Pat. No. 11,151,241, which is a
(Continued)

(51) Int. Cl.
*G06F 21/44* (2013.01)
*H04L 9/06* (2006.01)
(Continued)

(52) U.S. Cl.
CPC ............ *G06F 21/44* (2013.01); *H04L 9/0618* (2013.01); *H04L 9/0643* (2013.01); *H04L 9/0869* (2013.01); *H04L 9/3247* (2013.01)

(58) Field of Classification Search
CPC .......... G06F 21/57; G06F 21/31; G06F 21/52; G06F 21/10; G06F 21/53; G06F 21/74;
(Continued)

(56) References Cited

U.S. PATENT DOCUMENTS 6,742,121 B1 *  5/2004  Safadi .................... G06F 21/10
                                                             713/181
2004/0236819 A1 * 11/2004  Anati .................. H04L 63/0853
                                                             709/200
(Continued)

OTHER PUBLICATIONS

Abuhmed et al., "Software-Based Remote Code Attestation in Wireless Sensor Network", Global Telecommunications Conference, Nov. 30, 2009, pp. 1-8.
(Continued)

*Primary Examiner* — Sharif E Ullah
(74) *Attorney, Agent, or Firm* — MH2 TECHNOLOGY LAW GROUP, LLP

(57) ABSTRACT

A computer implemented method for validating software is provided. The method includes generating a first check value, by a remote computing device, based on a unique value and software of the remote computing device, outputting the first check value and the unique value from the remote computing device to a secure data repository, obtaining, by a secure computing device, an authentic copy of the software of the remote computing device, obtaining, by the secure computing device, the unique value and the first check value from the secure data repository, computing, by the secure computing device, a second check value based on the authentic copy of the software for the remote computing device and the unique value, and determining, by the secure computing device, whether the remote computing device has authentic software based on a comparison of the obtained first check value and the second check value.

23 Claims, 6 Drawing Sheets

Related U.S. Application Data division of application No. 16/820,163, filed on Mar. 16, 2020, now Pat. No. 11,080,387.

(51) Int. Cl.
*H04L 9/08* (2006.01)
*H04L 9/32* (2006.01)

(58) Field of Classification Search
CPC ...... G06F 12/1408; G06F 21/14; G06F 21/45; G06F 2212/1052; G06F 21/44; H04L 9/3234; H04L 9/3247; H04L 63/0861; H04L 63/083; H04L 63/0853; H04L 63/105; H04L 9/3228; H04L 63/0823; H04L 63/0435; H04W 12/06; H04W 4/80; H04W 12/00512; H04W 12/08; H04W 12/00; H04W 12/00522; H04W 12/0401; H04W 12/04031; H04W 12/0609
USPC ........ 726/2, 21, 36; 713/150, 155, 163, 181; 380/255, 264, 276
See application file for complete search history.

(56) References Cited

U.S. PATENT DOCUMENTS

| | | | | |
|---|---|---|---|---|
| 2007/0150857 | A1* | 6/2007 | Korkishko | G06F 21/645 717/136 |
| 2015/0370584 | A1* | 12/2015 | Ito | H04L 9/3228 703/26 |
| 2016/0132675 | A1* | 5/2016 | Fanton | H04L 63/145 713/165 |
| 2018/0114000 | A1* | 4/2018 | Taylor | H04L 9/0643 |
| 2019/0026981 | A1* | 1/2019 | Petersen | G07F 17/3244 |
| 2019/0238555 | A1* | 8/2019 | Buffard | H04L 63/0823 |
| 2020/0074059 | A1* | 3/2020 | Beckett, Jr. | G06F 21/36 |

OTHER PUBLICATIONS

Kohnhauser et al., "Ensuring the Safe and Secure Operation of Electronic Control Units in Road Vehicles", 2019 IEEE Security and Privacy Workshops (SPW), May 19, 2019, pp. 126-131.

Schellekens et al., "Remote Attestation on Legacy Operating Systems with Trusted Platform Modules", Electronic Notes in Theoretical Computer Science, vol. 197, No. 1, Feb. 20, 2008, pp. 59-72.

Extended European Search Report dated Jun. 2, 2021, EP Application No. 21162685.8, 7 pages.

* cited by examiner

VALIDATION OF SOFTWARE RESIDING ON REMOTE COMPUTING DEVICES

CROSS-REFERENCE TO RELATED APPLICATIONS

This application is a divisional of U.S. patent application Ser. No. 17/099,025, filed Nov. 16, 2020, now allowed, which is a divisional of U.S. patent application Ser. No. 16/820,163, filed Mar. 16, 2020, which issued as U.S. Pat. No. 11,080,387 on Aug. 3, 2021, the contents of all of which are hereby incorporated by reference in their entirety.

BACKGROUND

Computing devices can execute software retrieved from any number of sources. For the reliable, safe, and secure operation of a computing device, the computing device can incorporate techniques to ensure execution of authentic and authorized software rather than software that has been replaced, modified, or otherwise altered, for example, by an equipment failure, an accident, an unauthorized user, etc. In some examples, computing devices can implement techniques to access authorized data files used to configure a system to operate in a particular manner rather than unauthorized data files. Traditional methods for securing a computing device include a secure boot or the use of a Trusted Platform Module ("TPM"). With secure boot, the executable software is signed with a cryptographic digital signature, which the microprocessor validates prior to loading the software to execute. A keyed hash function, such as a hash-based message authentication code or "HMAC," may also be used as a secure boot method to secure a computing device. Because an unauthorized user or attacker does not have the key to create the signature or the HMAC checksum, the unauthorized user cannot alter the software and still have the signature/checksum match the modified code. Accordingly, the microprocessor will not load software with an invalid signature thus protecting the integrity of the system. Regarding a TPM based technique for securing a computing device, a TPM can be an auxiliary chip that will validate ("attest") the executable code and static data that the main CPU is executing. In some techniques, only if the code is validated, will the TPM release a key or other data to enable the main CPU to fully operate.

In some examples, secure boot and TPM techniques are functional for computing platforms that are equipped with a microprocessor that implements secure boot or a TPM chip. However, many computer platforms use standard microprocessors that do not have secure boot functionality and do not have a TPM. These systems cannot verify that their software hasn't been altered prior to entering the operational state and are thus subject to executing unauthorized software, which may compromise the security, safety, and/or reliability of the computer system. Examples of these computing platforms include most older computerized devices, computerized consumer devices, many Internet of Things ("IoT") devices, and specialized computerized devices such as the electronic control units ("ECUs") used to control vehicle operations, among others. As one example, without the ability to validate the software and data in all of the safety-critical ECUs in a vehicle, the vehicle as a whole cannot be presumed to be in a known good safe state.

Moreover, in many, if not most, cases, secure-boot-equipped and TPM-equipped computer platforms and devices may execute a power-on reset (which invokes secure boot) only rarely. For instance, some ECUs in a vehicle go into a sleep mode when the vehicle is turned off, and only awake from sleep when the vehicle ignition is turned on. Thus, such ECUs do not regularly perform a secure boot because they do not typically power down. In these types of ECUs, the ECU software is at risk of being modified by an unauthorized user without detection.

SUMMARY

Disclosed herein are systems, methods, and devices for validating software residing in remote computing devices. In various implementations, a computer implemented method for validating software is provided. The method includes generating a first check value, by a remote computing device, based on a unique value and software of the remote computing device, outputting the first check value and the unique value from the remote computing device to a secure data repository, obtaining, by a secure computing device, an authentic copy of the software of the remote computing device, obtaining, by the secure computing device, the unique value and the first check value from the secure data repository, computing, by the secure computing device, a second check value based on the authentic copy of the software for the remote computing device and the unique value, and determining, by the secure computing device, whether the remote computing device has authentic software based on a comparison of the obtained first check value and the second check value.

Generating the first check value may include calculating the first check value based on a predetermined criteria.

The predetermined criteria may include one or more of a predetermined time interval calculated from a previous validation time, a random time interval, and a state change of the remote computing device.

Generating the first check value may include generating the first check value using at least one of the unique value and an additional input as an encryption key for a cryptographic checksum computation that produces the first check value, and computing the second check value may include computing the second check value using at least one of the unique value and the additional input as an encryption key for a cryptographic checksum computation that produces the second check value.

The method may further include transmitting, from the remote computing device to the secure computing device, user data, wherein generating the first check value may include generating the first check value based on the unique value, the software, and the user data, and wherein computing the second check value may include computing the second check value using the unique value, the authentic copy of the software, and the user data.

The method may further include storing metadata in a memory of the secure computing device, the metadata comprising the predetermined criteria.

The generating of the first check value may include generating the first check value based on the unique value, the software, and static data stored in a memory of the remote computing device.

The static data may include at least one of one or more binary executable files, one or more data files, and one or more directories.

The first check value may be generated based on a hash-based message authentication code ("HMAC") or a Cipher-based Message Authentication Code ("CMAC") function applied to the static data, wherein dynamic data of the remote computing device is excluded.

The method may further include receiving, by the remote computing device, a validation request from the secure computing device, wherein the receiving occurs prior to the generating of the first check value.

The method may further include detecting, by the secure computing device, that the remote computing device has transitioned from a lower powered state to a higher powered state, and transmitting, by the secure computing device, the validation request following the detection.

The validation request may be received at a random time selected within a predetermined number of hours of the day.

The outputting the first check value and the unique value and the obtaining the unique value and the first check value from the secure data repository may be performed over an unsecured digital channel.

The method may further include at least one of disabling or partially disabling the remote computing device, and correcting or recovering the software in the remote computing device, based on the determining.

The unique value may include at least one of a data string or a nonce.

According to further embodiments, a computer implemented method for validating existing software of a remote computing device by a secure computing device, is provided. The method includes receiving, by the remote computing device a software validation request comprising a unique value, from the secure computing device, generating, by the remote computing device a first check value based on a unique value and existing software installed on the remote computing device, providing the first check value to a secure data repository, obtaining, by the secure computing device, an authentic copy of the software installed on the remote computing device, wherein the authentic copy is a last known authorized software provided to the remote computing device, obtaining, by the secure computing device the first check value from the secure data repository, computing, by the secure computing device, a second check value based on the authentic copy of the software and the unique value, determining, by the secure computing device, whether the existing software of the remote computing device is valid based on a comparison of the obtained first check value and the second check value, and providing, by the secure computing device, an instruction modifying operation of the remote computing device in response to a determination that the existing software is not valid.

The modifying may include one or more of disabling or partially disabling the remote computing device, correcting or recovering the existing software in the remote computing device, preventing data transfer from the remote computing device, and sending an alert from the remote computing device.

The software validation request may indicate a time limit for generation of the first check value by the remote computing device.

The secure computing device may stores information related to an estimated time for generating of the first check value by the remote computing device, wherein, if an actual time for generation of the first check value deviates by greater than a predetermined threshold from the estimated time, the existing software is determined as not valid regardless of the comparison of the obtained first check value and the second check value.

The validation request may be received immediately following at least one of a detection that the remote computing device has transitioned from a lower powered state to a higher powered state, expiration of a randomly determined time period, and expiration of a non-random predetermined interval since receipt of a previous validation request.

The unique value may include at least one of a data string or a nonce.

According to still further embodiments, a system for validating software, is provided. The method includes a secure data repository configured to store a unique value and a remotely generated check value, wherein the remotely generated check value is generated by a remote computing device based on the unique value and software of the remote computing device, a trusted software repository configured to store an authentic copy of the software of the remote computing device, and a secure computing device in communication with the secure data repository and the trusted software repository. The secure computing device is configured to obtain an authentic copy of the software of the remote computing device, obtain the unique value and the first check value from the secure data repository, compute a second check value based on the authentic copy of the software of the remote computing device and the unique value, and determine whether the remote computing device has authentic software based on a comparison of the obtained first check value and the second check value.

The unique value may include at least one of a data string or a nonce.

BRIEF DESCRIPTION OF THE DRAWINGS

The accompanying drawings, which are incorporated into and constitute a part of this specification, illustrate examples of numerous features of the disclosed subject matter. The accompanying drawings, together with the description, serve to explain the principles of the various techniques described herein.

DETAILED DESCRIPTION

Figure 1:
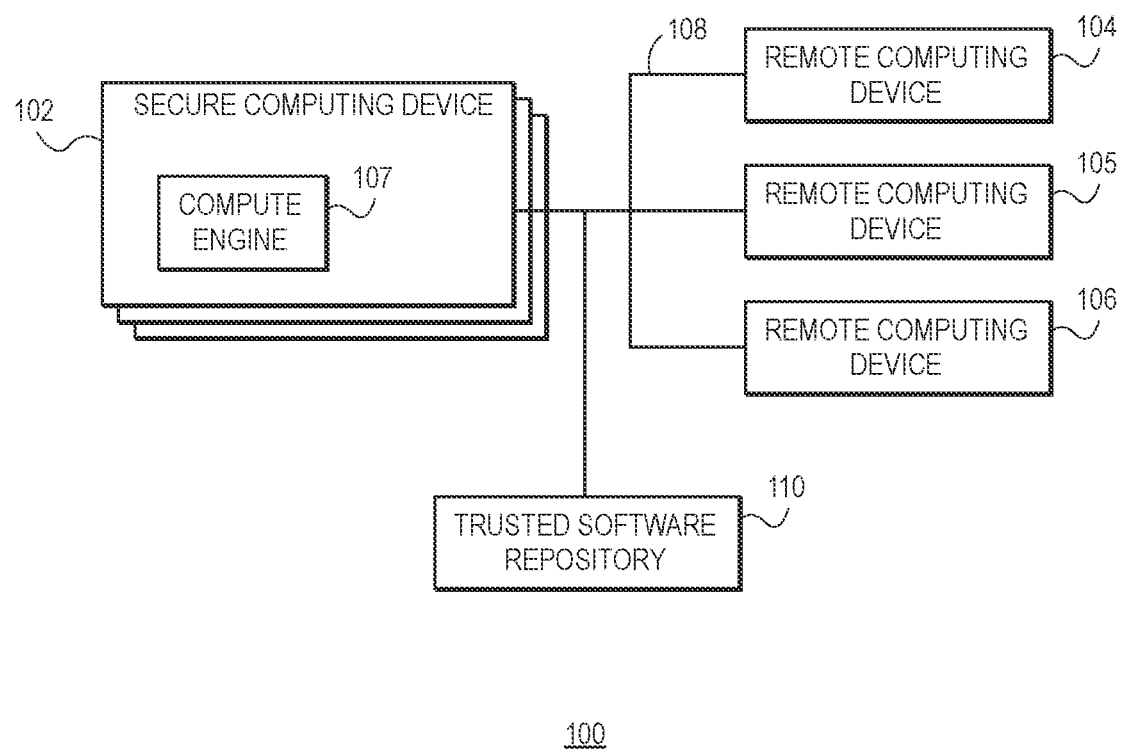
FIG. 1 is a block diagram of an example system for validating software residing on a remote computing device, according to example embodiments described herein.

Reference will now be made in detail to various implementations of the techniques described herein, examples of which are illustrated in the accompanying drawings. Wherever convenient, the same reference numbers will be used throughout the drawings to refer to the same or like parts.

The techniques, methods, and devices described herein can validate the software stored within any suitable computing device, such as an embedded computing device, among others. For example, the techniques and devices described herein include a secure computing device that performs a remote validation of the software and static data residing in a remote computing device. Thus in various embodiments, the secure computing device acts as the controller or manager of the validation process and interacts with computing devices that typically are not co-located with it, and are generally referred to herein as remote computing devices. The secure computing device can implement the techniques described herein to ensure that a remote computing device is executing valid or authorized software and associated data, as contrasted with software and data that has been changed or tampered with (either maliciously or by accident) or that is outdated or the like (e.g., an old software release that has been superseded). For many existing computerized devices that are deployed remotely (e.g., IoT devices, computerized medical devices, ECUs in vehicles, etc.), the secure computing device cannot simply request that the remote computing device perform a checksum or hash of the remote computing device's program space and send that check value (e.g., checksum) back to the secure computing device for comparison with a local, known good value stored at the secure computing device because an unauthorized user or the like may change the software residing in the remote computing device to supply or recalculate the previous verified check value, which was in the remote computing device before the unauthorized user or software corrupted the remote device. Furthermore, it is typically the case with existing computerized devices that there is no secure communications channel between the remote computing device and the secure computing device that is trying to verify or validate the remote device's software. Accordingly, in such cases, the data sent between the remote computing device and the secure computing device cannot be presumed to be authentic-because, for example, the data (e.g., the check value, checksum, or the like) may come from somewhere other than the remote computing device that is being verified or validated.

The techniques described herein validate software stored on a remote computing device with a separate secure computing device. For example, rather than retaining a check value, such as a hash-based message authentication code ("HMAC") value, for the remote computing device's software and data, various implementations of the techniques described herein include using a secure computing device to store an authentic, valid copy of the remote computing device's software and optionally, static data. In some such implementations, in order to validate the software and static data on the remote computing device, the secure computing device can send to the remote computing device a request for validation, which may include a unique value, such as a random data string or value (e.g., a nonce) of the current time of day in microseconds, or the like. Then, in response to the request, the remote computing device can perform a check value calculation with that supplied random data string or value (e.g., an HMAC calculation, or a block cipher based MAC, such as CMAC, among others) on its software and static data, or can create a digital signature of its software and static data.

In some embodiments, when the remote computing device receives a request for verification that includes a unique value, such as a nonce, the remote computing device can use the received nonce directly as the key or in combination with a key available to the remote computing device for an HMAC computation or a cipher based MAC computation (the "check value") on its software and static data.

In various embodiments, the remote computing device sends the check value that it computed back to the secure computing device that sent the request. The secure computing device can use the same nonce and shared key (if used) to compute the check value (e.g., HMAC result) on the verified copy of the remote computing device's software and static data that resides on the secure computing device.

If the check value that the secure computing device received from the remote computing device matches the locally generated check value on the secure computing device, then the remote computing device's software and static data can be considered validated and correct because if any software code or static data in the remote computing device were different from the validated copy stored in the secure computing device, then the check value computation done by the remote device will necessarily produce a different check value, given that the same nonce and/or key is used in the computation by both systems. In some embodiments, the check value, as used herein, is a cryptographically computed value based on any suitable cryptographic technique. In some examples, the check value is determined with any suitable cryptographic technique, such as SHA-256, among others, that can prevent an unauthorized user from computing the same value without verifying the software. The use of the nonce, which is unique per validation request, can ensure that older check values cannot be replayed or reused by an unauthorized user.

The techniques and devices described herein include various practical applications and technical enhancements over conventional systems. For example, the secure computing device can periodically request validations of the remote computing device's software. Thus, the remote computing device can be validated when the remote computing device awakes from a sleep state, or at any other time. The techniques herein can verify and ensure the execution of authorized software in systems that may almost never go through a power-on reset such as industrial control systems, among others. Additionally, the techniques herein can enable a remote computing device to validate its software with less or no interference with its normal operation by scheduling the validation to occur during periods of inactivity when the remote computing device has adequate resources available, such as CPU resources.

In some embodiments, the techniques and devices described herein do not require the remote computing device to have special security equipment or to perform burdensome, performance-affecting processing and do not impact the cost of the remote computing device. As described herein, the data sent over the communications channel between the secure computing device and the remote computing device is minimal (e.g., a validation request that includes a nonce, and a response that includes a check value), which advantageously reduces communication bandwidth usage and which enables communications via equipment and infrastructure having limited bandwidth and performance-limited channels, such as a controller area network ("CAN") bus or a local interconnect network ("LIN") bus, among others. In some examples, the communications channel between the secure computing device and the remote computing device can be a WiFi communication channel, a Bluetooth communication channel, a 5G communication channel, or an Ethernet communication channel, among others. In some embodiments, the communication channel can be a system bus within an enclosure of a device with two or more different printed circuit boards or modules. In some examples, the communication channel can be included within any suitable internet of things (IoT) system for healthcare applications, industrial control systems, and the like. For example, a module of a system may have a secure microprocessor that can perform a secure boot, but other modules of the system may not have a secure microprocessor. The secure microprocessor equipped module can periodically use techniques described herein to validate the software in the other modules without secure microprocessors. In some examples, an external system can periodically validate the software of the secure microprocessor equipped module.

In some embodiments, a single secure computing device can validate a multitude of remote computing devices which comprise a complex system. For example, a vehicle may be equipped with a novel, specialized gateway ECU having the secure computing device functionality described herein, and the gateway ECU can validate some or all the other ECUs in a vehicle, which may number 50 or more. In some examples, the validation techniques described herein can be controlled and instigated from a central secure computing device that can communicate over any distance and over any network to a remote computing device(s). For example, a secure computing device located in a central data center could communicate over the internet, or any suitable network, to remote computing devices deployed anywhere in the world. Additionally, in some implementations, should the secure computing device detect a fault or problem in a remote computing device, the secure computing device can initiate a recovery procedure or the like in that remote computing device; or the secure computing device can place an entire complex system, such as a vehicle containing the problematic remote computing device (e.g., ECU), in a safe state.

Rather than being merely directed to data manipulation, the techniques herein are directed to an improved software validation system that enables determining whether a remote device is executing authentic software or whether an unauthorized user has modified the software of a remote device. Additionally, the techniques described herein employ a new way of validating software executed by remote devices based on the generation of remote check values by the remote devices and local check values by secure computing devices.

FIG. 1 is a block diagram of an example system for validating software residing on a remote computing device. The system 100 can include one or more secure computing devices 102 and one or more remote computing devices 104, 105, and 106. In some examples, the secure computing devices 102 can be any suitable computing device such as a managing or gateway electronic control unit, a desktop device, a laptop device, a wearable device, a server, or one module of a system containing many intelligent modules connected by a backplane and the like. In some embodiments, a secure computing device 102 can be part of, a subsystem of, or correspond to one or more of a vehicle, a watercraft (e.g., a boat), an aircraft, a spacecraft, a medical device, a robot, a drone, a wireless or wired communication module, and an IoT device. In some embodiments, a secure computing device 102 can be, or be part of a specialized onboard unit that primarily performs the functions of a secure computing device as described herein. The remote computing devices 104, 105, and 106 in some examples, can correspond to any number of remote computing devices, such as onboard units ("OBUs") or ECUs of a vehicle, a watercraft, an aircraft, a spacecraft, a robot, a drone, a medical device, or an IoT device. For example, in vehicular embodiments, the remote computing devices 104, 105, and 106 can include any number of ECUs that store software and/or data, which can be validated by a secure computing device 102. For example, the remote computing devices 104, 105, and 106 may be various ECUs, such as an Engine Control Module (ECM), a Powertrain Control Module (PCM), a Transmission Control Module (TCM), a Brake Control Module (BCM or EBCM), a Central Control Module (CCM), a Central Timing Module (CTM), a General Electronic Module (GEM), a Body Control Module (BCM), a Suspension Control Module (SCM), or the like. In some transportation-related embodiments, the remote computing devices 104, 105, and 106 can be or correspond to a roadside unit (RSU) of a traffic control device (e.g., a traffic signal, a traffic light, or electronic traffic signage), a digital billboard, a pedestrian warning system, a motorcycle sensor, a bicycle sensor, or an electronic sign, among others.

In various implementations, the secure computing devices 102 can include a compute engine(s) 107 that can validate the software of a remote computing device 104, 105, 106; e.g., can determine whether or not the software in a remote computing device is authentic, up-to-date, and/or unaltered from its original form. In some embodiments, the compute engine 107 may or may not be or include hardware security modules ("HSMs") (not depicted). The HSMs can enhance the security of techniques herein and enable the secure computing devices 102 and remote computing devices 104 to perform secure computations with greater security against threats from unauthorized users and the like. In some implementations, the compute engines 107 may, or may be designed to, perform secure computations themselves without requiring an embedded HSM.

In various implementations, different HSM versions may be used in the compute engines 107. For example, the HSMs may include embedded HSMs installed as plug-in cards within one or more of the compute engines. In such example implementations, the embedded HSMs may be installed in one or more of the compute engines as Peripheral Component Interconnect (PCI) HSMs or PCI Express (PCIe) HSMs. Also, for instance, the HSMs in the compute engines 107 may include external, network-attached or network-connected HSMs that are separate from compute engines in their own enclosures. In some embodiments, the HSMs can be embedded or integrated into a cryptographic processor of a microprocessor. In some examples, a microprocessor can perform a secure boot so that software executed by the microprocessor is validated with a firmware program capable of computing a cryptographic checksum or validating a digital signature. In some embodiments, an external hardware module can implement the HSM functionality.

In some embodiments, the secure computing devices 102 and the remote computing devices 104, 105, and 106 can communicate through any suitable digital channel 108 such as a CAN bus, or a LIN bus, among others. In some examples, the digital channel 108 can be secure or unsecure. For example, the secure computing devices 102 and remote computing devices 104, 105, and 106 can communicate through unsecure digital channels when the software executed by or contained in each of the remote computing devices 104, 105, and 106 is validated. The validation of the software residing on the remote computing devices 104, 105, and 106 via the secure computing device 102 is described in greater detail below in relation to FIGS. 2 and 3. In some examples, a trusted software repository 110 can provide authentic software to the remote computing devices 104, 105, and 106 and/or the secure computing device 102 via the digital channel 108. For example, the trusted software repository 110 can store the authentic software that is supposed to be stored in and executed by each remote computing device 104, 105, and 106. As noted, if the remote computing device 104, 105, and 106 are different from each other (e.g., if device 104 is a PCM, device 105 is a TCM, and device 106 is an EBCM), then the trusted software repository 110 stores a copy of the authentic software and associated static data (e.g., a configuration file) for each of those three devices 104-106; e.g., it stores three different software programs, images, or the like.

One of ordinary skill will recognize that the components and implementation details shown in FIG. 1 are examples presented for conciseness and clarity of explanation. Other components, processes, implementation details, and variations may be used without departing from the principles of the techniques described herein, as this example is not intended to be limiting and many variations are possible. For example, the system 100 can include any suitable number of secure computing devices 102 and remote computing devices 104 and the secure computing devices 102 and remote computing devices 104 can communicate via any number of digital channels 108. In some examples, the secure computing device 102 can be located at any suitable distance from the remote computing devices 104, 105, and 106 such that the digital channels 108 may include global communication networks. For example, the secure computing device 102 may not be located in close proximity to the remote computing devices 104, 105, and 106.

Figure 2:
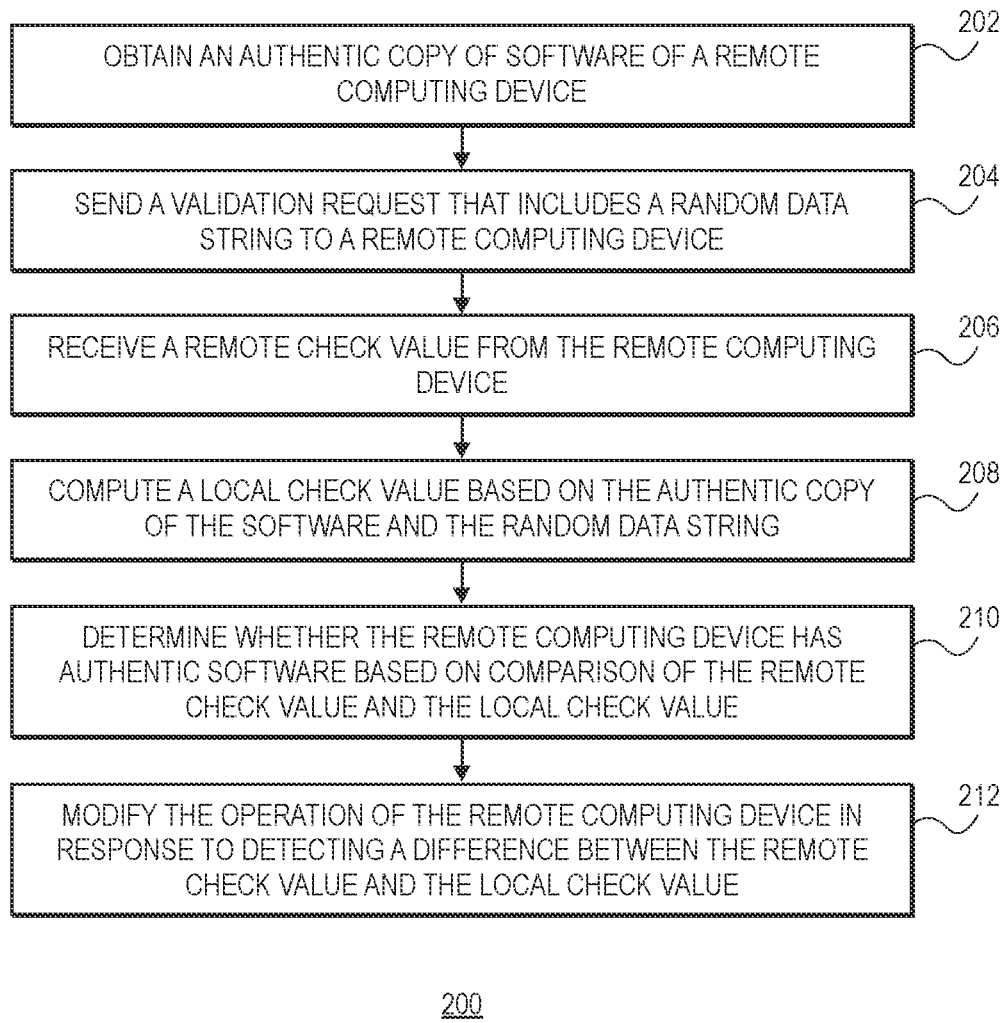
FIG. 2 is a process flow diagram of an example method for validating software residing on a remote computing device with a secure computing device, according to example embodiments described herein.

FIG. 2 is a process flow diagram of an example method for validating software residing on a remote computing device. The method 200 can be implemented with any suitable computing device, such as a secure computing device 102 of FIGS. 1 and 408 in FIG. 4.

At block 202, a secure computing device can obtain an authentic copy of the software that is, (or that is supposed to be), stored within and/or executed by a remote computing device. In some embodiments, the secure computing device can obtain the authentic copy of the software via any suitable network connection, the Internet, and the like. In some examples, the secure computing device can obtain the authentic copy of the software from the remote computing device during an initialization period, e.g., when the remote computing device is manufactured and/or initially provisioned, such as during the manufacturing of a car that has multiple OBUs. For example, the software can be stored or installed on both the secure computing device and the remote computing device during the initialization period. In some cases, the secure computing device and the remote computing device may not have access to a remote network during the initialization period and/or may not have any outside network connections during the initialization period. In such cases, the secure computing device and the remote computing device may obtain the authentic software from any suitable computer-readable media such as a universal serial bus ("USB") device, a CD-ROM, a Bluetooth™ enabled device, and the like.

In some embodiments, the secure computing device can also or alternatively obtain the remote device's authentic software from a storage device (e.g., a storage device that implements the trusted software repository 110), which could be accessible locally or over a network such as a CAN or a PCI bus, among others. The storage device may be downloaded to or programmed during the initialization period, such as the manufacturing period of time. The storage device can be updated occasionally to contain the latest authentic software on the remote device. In some examples, the software to be installed on a remote computing device is cryptographically signed (or verified based on a message authentication code) to enable the secure computing device to determine if the software is the latest authentic software. In some embodiments, the copy of the software may be stored in trusted storage and/or protected by a digital signature or a cryptographic checksum to protect the software from undetected modification.

In some embodiments, the secure computing device can obtain any number of copies of software for any number of remote computing devices, such as electronic control units, among others. In general, the secure computing device needs authentic copies of the software for the remote devices that are to be validated or assessed. Accordingly, the secure computing device may not obtain the software from a remote device, because the software on the remote computing device may have been intentionally or unintentionally altered or replaced, such that it is no longer authentic. Rather, the secure computing device should download, store, be programmed with, or otherwise obtain the authentic software from a trusted device. For example, the secure computing device can obtain the software from a secure repository or the like during manufacturing of the secure computing device and can periodically receive updates via secure communications from a trusted source, e.g., via secure over-the-air updates from a trusted software repository 110. In some such examples, the secure computing device can have access to a trusted repository that includes a digital signature or message authentication code (MAC) for individual software components or for the total collection of components such that an unauthorized user or unauthorized software cannot substitute or alter software without detection.

As noted previously, in various vehicular-related embodiments, each remote computing device may be an electronic control unit that stores and executes software that manages a different component or subsystem within a vehicle, a roadside unit, or the like. As discussed above in relation to FIG. 1, the vehicles having ECU(s) include an automobile, a watercraft (e.g., a boat), an aircraft, a spacecraft, a drone, etc. In some embodiments, the electronic control units can reside in a roadside unit (RSU) such as a traffic control device (e.g., a traffic signal, a traffic light, or electronic traffic signage), a digital billboard, a pedestrian warning system, a motorcycle sensor, a bicycle sensor, or an electronic sign, among others. Moreover, remote computing devices are, or are included in, many non-vehicular-related devices, such as a medical device, a robot, a wireless or wired communication module, or an IoT device, among others.

In some examples, the remote devices (e.g., electronic control units or roadside units) can communicate with the secure computing device via a CAN bus, a LIN bus, Ethernet, a network connection, or a Bluetooth™ connection, among others. In various implementations, the secure computing device can validate the software from or in any number of remote computing devices, as discussed in greater detail below in relation to blocks 204-212.

At block 204, the secure computing device can send a validation request that includes a random data string to a remote computing device. Random data, as referred to herein, can include any time variant data that is unique per validation request and which includes sufficient entropy to prevent an unauthorized user from pre-computing or otherwise determining the value of the random data. In some embodiments, the validation request can indicate that the remote computing device is to provide information that the secure computing device uses to verify or validate the authenticity of the software that is currently stored in and/or executed by the remote computing device. In some implementations, the random data string, which may also be known as a nonce, can be used as a digital cryptographic key for a cryptographic checksum computation or as a variable in a digital signature during the validation process.

In various implementations, the secure computing device can send the validation request for a particular remote device periodically at any suitable static time interval, or at a random time interval. For example, the secure computing device can send a validation request to a remote computing device at a static time each day, each month, or each year, among others. In some other examples, the secure computing device can select random time intervals to send the validation request based on a random time within a predetermined number of hours, days, or months, events, among others. For example, the secure computing device can send the validation request to a remote computing device at any randomly selected time in a day, or a random time selected within a number of hours of the day.

In some embodiments, the secure computing device can validate the software of the remote computing device when the period of time since the last validation (or since initialization) exceeds a predetermined threshold, or in response to an external signal corresponding to user input. For example, the secure computing device can validate the software of the remote computing device after a suitable, predetermined number of seconds, minutes, hours, days, months, years, and the like have passed without validation, such as 12 hours, 30 days, six months, or one year. In some embodiments, validating the software of the remote computing device can be performed in response to a system event such as whenever the remote computing device transitions from a sleep state to a fully functioning state, among others. For example, the secure computing device may receive or otherwise detect an indication from the remote computing device or from other systems that the remote computing device has transitioned from any suitable sleep state, partial power state, and the like, to a fully powered and functioning state. The secure computing device can respond to the indication of the power state change of the remote computing device by transmitting a validation request to the remote computing device. In various embodiments, any change in the power state of the remote computing device, or of a system in which the remote computing device resides, can trigger transmitting the validation request to the remote computing device. For example, a transition from any lower powered state to a higher powered state by the remote computing device can result in generating and transmitting a power-change indication to the secure computing device, which can initiate validation of the software residing on the remote computing device. In some examples, the secure computing device can respond to an indication of a power state change instigated by a vehicle being started, or the like, where starting the vehicle changes the power of one or more of its embedded OBU remote computing devices. The secure computing device can also implement a delay between detecting a power state change and requesting validation of a remote computing device.

At block 206, the secure computing device can receive, obtain, or detect a remote check value from the remote computing device, which in various embodiments may create and provide the remote check value in response to the validation request of block 204. In various implementations, the remote computing device may calculate, compute, or generate the remote check value using or based on the random data string and the software on the remote computing device. In some examples, the remote check value can be generated with the random data string used as an encryption key for an encryption computation that is run on the software stored within the remote computing device. In various examples, the random data string can be in the form of a digital key, a block cipher based message authentication code, or a nonce for any suitable HMAC encryption algorithm. In some embodiments, the random data string can be appended to the software or otherwise combined with the software in some manner before signing the software, which enables generating a unique digital signature. In some examples where a fixed key is used, the random data string (e.g., nonce) forces each computation to produce a different result and thus assures freshness, which prevents replaying older computations by an unauthorized device or software. In some embodiments, the remote check value can be generated with a hash function without an encryption key. For example, the remote check value can be generated by hashing a nonce value and software.

In some embodiments, the remote check value is calculated, computed, or generated using software that includes static information or read-only information or the like that is stored in the remote computing device, in combination with, the random data string and the software on the device. For example, the remote check value can be generated by an HMAC function applied to the static information on the remote device, such as binary executables, files, directories, and the like, but in which one of the static files is used as a key. In some embodiments, the remote computing device can identify and exclude any dynamic information such as temporary files, user input data, sensor data, variables, and the like. For example, the remote computing device can maintain a list of files corresponding to static information and a separate list of files corresponding to dynamic information that can be modified or changed over time. The remote check value can be generated based on a HMAC function applied to the static information files only, while disregarding the dynamic information files. In some embodiments, the HMAC or a CMAC function can generate the remote check value based on the static information from the list in combination with a nonce or a digital signature, among other things. For example, the hash function can generate the remote check value based on a cipher with a fixed key and the nonce combined with the software as plaintext. In some embodiments, other appropriate cryptographic checksum computation techniques can be used to generate the remote check value.

At block 208, the secure computing device can generate or compute a local check value based on, or using, the authentic copy of the software that is in the remote computing device (from block 202) and the random data string. In some embodiments, the secure computing device generates the local check value by using the same algorithm or technique that was used by the remote computing device to generate the remote check value and by using the random data string in the same way as the remote computing device used it. In contrast, the secure computing device uses the authentic copy of the software to generate the local check value, while the remote computing device uses its internal copy of the software to generate the remote check value. Under these conditions, if the remote computing device's internal copy of its software is the same as the authentic copy of the software, then the remote check value will be the same as the local check value; otherwise, the two values will differ.

In some implementations, the local check value may be computed or generated by using the random data string as the encryption key for an encryption computation that is run on the authentic copy of the software. In such implementations, the random data string is applied to, combined with, or used with the software residing in the secure computing device using the same technique that applied, combined, or used the random data string and the software residing in the remote computing device; and the same encryption computation is used by both the secure computing device and the remote computing device. In various examples, the encryption computation can include a hash-based message authentication code that uses a cryptographic hash function, and a random nonce used as the encryption key, among others. In some examples, the random data string can be used as a digital key that is used in order to verify the software using any suitable cipher based MAC algorithm. In some examples, a hash function applied to a nonce value and software can be used for the encryption computation without an encryption key.

At block 210, the secure computing device can determine or verify whether or not the remote computing device is executing authentic software based on a comparison of the remote check value and the local check value. For example, in various implementations, the remote check value and the local check value will be the same value if the software residing on the remote computing device is authentic—e.g., has not been altered and is the same as the known-to-be authentic copy of the software obtained by the secure computing at block 202. If the remote check value and the local check value are the same value, then the secure computing device may determine that the remote computing device is indeed executing authentic software, and the secure computing device has no need to perform additional operations, although in some implementations it may save a record of the satisfactory validation. Similarly, the remote check value and the local check value will be different values if the software residing on the remote computing device has been modified, altered, or is otherwise not the same as the as the known-to-be authentic software obtained by the secure computing at block 202. For example, if an unauthorized or unintentional modification has been made to the software residing on the remote computing device, the remote check value will differ from the local check value generated by the secure computing device. If the remote check value and the local check value are different, (which indicates that the remote computing device is not using authentic software), then the secure computing device may take additional action(s), for example, to alert an operator, to disable or partially disable the remote computing device, to correct or recover the software in the remote computing device, or otherwise address the problem.

As one example of an additional action, at block 212, the secure computing device can modify the operation of the remote computing device in response to determining or detecting a difference between the remote check value and the local check value; e.g., from the comparison of block 210. For example, the secure computing device can disable the remote computing device (e.g., turn it off) or partially disable the remote computing device, (e.g., command it to enter a safe mode or the like). In addition, the local secure computing device may generate an alert and the like. In some additional or alternative embodiments, the secure computing device may modify the operation of the overall system which incorporates the remote computing device, such as modifying the operation of a passenger vehicle that contains an ECU that has non-authentic software.

In some embodiments, the secure computing device can initiate the recovery of the remote computing device in response to detecting a difference between the remote check value and the local check value. In some examples, recovery of a remote computing device can include loading or re-flashing known-to-be authentic software into the remote computing device to replace the non-authentic software detected at block 210. In various vehicular embodiments, the recovery of a remote computing device can also or alternatively include the secure computing device sending instructions to ECUs of a vehicle to enter a safe state or a defined error response state, such as a "limp home" mode that reduces a maximum speed of a vehicle.

In some examples, the secure computing device can modify the operation of another remote computing device, or of multiple other remote computing devices, that form or are part of the same system (e.g., that are in the same vehicle) in response to detecting a difference between a remote check value and a local check value (i.e., detecting non-authentic software) in a single remote computing device in the overall system. For example, the secure computing device can initiate the recovery of each electronic control unit (or of one specific other ECU, or of a specific subset of all the ECUs) in a vehicle in response to detecting non-authentic software, (which may have dangerous accidental corruptions, unauthorized modifications, malicious hacks, or the like), in any single electronic control unit. In some embodiments, the secure computing device can request or command the remote computing device to enter a safe state or safe mode in response to detecting a difference between the remote check value and the local check value. In some examples, the safe state can include modifying or disabling the operation of a system or a subsystem that includes or is controlled by a remote computing device. For example, the safe state can include preventing a rotation of an arm of a welding robot, guiding an autonomous vehicle to a side of a road, or restricting a set of speeds and functions available to a vehicle, among others.

The process flow diagram of FIG. 2 is not intended to indicate that the operations of the method 200 are to be executed in any particular order, or that all of the operations of the method 200 are to be included in every case. Additionally, the method 200 can include any suitable number of additional operations. For example, the method 200 can also include obtaining user data from the remote computing device, wherein the user data includes a device identifier, device name, and the like. In some examples, the device identifier can include a hardware specific value, such as an electronic serial number of a microprocessor, or the like. In some embodiments, the method 200 can include generating the remote check value based on a combination of the software of the remote computing device, the random data string, and the user data from the remote computing device. In some embodiments, the method 200 can include computing the local check value based on a combination of the copy of the software of the remote computing device, the random data string, and a copy of the user data obtained from the remote computing device or from the computer capable of accepting user input which provides it to both the remote computing device and the secure computing device.

Figure 3:
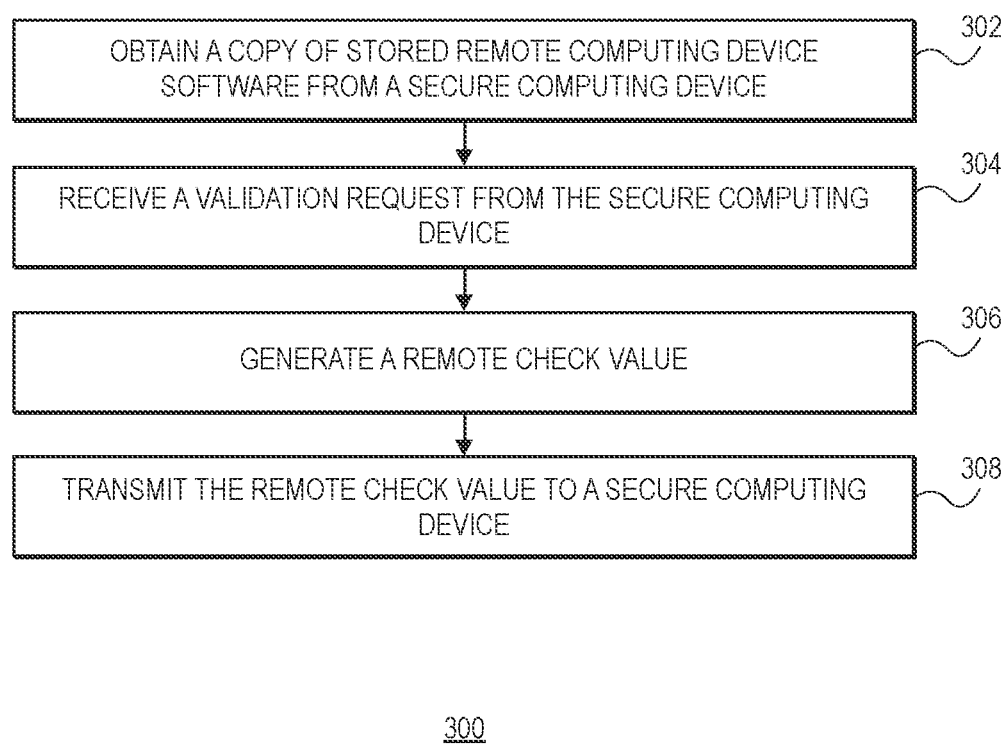
FIG. 3 is a process flow diagram of an example method for a remote computing device to enable validation of software residing on the remote computing device, according to example embodiments described herein.

FIG. 3 is a process flow diagram of an example method for a remote computing device to enable validation of software residing on the remote computing device. The method 300 can be performed with any suitable computing device, such as the remote computing device 104 of FIG. 1 or a vehicle gateway, among others.

At block 302, the remote computing device can obtain a copy of stored software also provided to a secure computing device. In some embodiments, the remote computing device can receive a copy of the software also stored locally or internally to a secure computing device during the initialization process described above in relation to bock 202 of FIG. 2. For example, the remote computing device can receive a copy of the software via any suitable network connection. In some embodiments, the remote computing device can receive a copy of the software to any suitable computer-readable media, such as a universal serial bus ("USB") device, CD-ROM, and the like. In some embodiments, the remote computing device can receive the copy of the stored software from a trusted software repository accessible by the remote computing device and the secure computing device. In some examples, the remote computing device and the secure computing device can obtain the copy of the stored software at different times and locations. For example, the remote computing device can obtain the software during manufacturing, while the secure computing device can obtain the software at a later time.

In some embodiments, the remote computing device can be configured to have an amount of storage and/or memory that stores the copy of the received software with an additional predetermined amount of available storage and/or memory. For example, the predetermined amount of available storage and/or memory can be 10 megabytes, 100 megabytes, or any other suitable value. In some examples, the available storage of the remote computing device can store random data values. In some examples, the random data values can be shared or otherwise transmitted to the secure computing device to enable the secure computing device to compute its local copy of the check value. The cryptographic checksum can then be computed over the total available storage, including the stored program software and the random data filling the remaining available space. This technique can prevent the remote computing device from storing both the malware and a copy of the legitimate software in its memory and using the legitimate copy of the software to compute the correct answer or cryptographic checksum value for the validation request, but then execute other unauthorized stored software.

At block 304, the remote computing device can receive a validation request comprising a random data string from the secure computing device. In some embodiments, the remote computing device can cause the secure computing device to generate and transmit the validation request to the remote computing device. For example, the remote computing device can transmit an indication to the secure computing device that the remote computing device has transitioned from a sleep state to a fully functioning state. In some embodiments, the remote computing device can generate the indication when the remote computing device has transitioned from any suitable sleep state, partial power state, and the like, to a fully powered and functioning state. As discussed above in relation to FIG. 2, the secure computing device can respond to the indication of the power state change of the remote computing device by transmitting a validation request to the remote computing device. In some embodiments, any change in power state of the remote computing device can trigger generating and transmitting an indicator to the secure computing device. For example, a transition from any lower powered state to a higher powered state within the remote computing device can result in generating and transmitting an indication to the secure computing device to initiate validation of software residing on the remote computing device. In some embodiments, the remote computing device can receive a validation request at any suitable random time period, static time period, and the like.

In some embodiments, the validation request can indicate a time period during which the remote value is to be calculated or generated as described in greater detail below in relation to block 306. In some examples, the time period is determined based on a number of instructions that the processor of the remote computing device can execute per second or any other suitable time frame. For example, the validation request can indicate that the remote computing device has a time period of five seconds, 10 seconds, or any other suitable amount of time, to generate or calculate a remote check value. In some examples, the remote computing device can be configured to perform the software check or validation immediately upon receipt of the validation request. The secure computing device can have a local time estimate of the time required for the remote computing device to perform the software check and send the remote check value to the secure computing device. If the remote device performs the software check too quickly or too slowly, then the secure computing device can determine that the remote computing device may be executing unauthorized software. In some embodiments, the secure computing device can store metadata indicating a time period for the remote computing device to compute the remote check value, wherein the time period is based on one or more performance attributes of the remote computing device. The performance attributes can include a processor speed, a memory read/write speed, and the like. This technique can prevent the remote computing device from compressing stored legitimate software in order to store unauthorized software. In some examples, the time period of the validation request can prevent the remote computing device from decompressing the legitimate software to provide the correct remote check value.

At block 306, the remote computing device can calculate, compute, or generate a remote check value based on the random data string used as an encryption key for an encryption computation of the software, or based on a hash function applied to a nonce value and software without an encryption key. In some embodiments, the remote check value is generated based on the static information or read-only information stored in the remote computing device. For example, the remote check value can be generated by an HMAC function applied to the static information such as binary executables, files, directories, and the like. In some embodiments, the remote computing device can identify and exclude any dynamic information such as temporary files, user input data, and the like. For example, the remote computing device can maintain a list of files corresponding to static information and a separate list of files corresponding to dynamic information that can be modified. The remote check value can be generated based on a hash function applied to the list of static information while disregarding the dynamic information from the cryptographic checksum function calculation. For example, the remote computing device can identify a set of static executable files and create generate the remote check value based on applying any suitable HMAC function, among others, to the binary representations of the static executable files. In some embodiments, the remote computing device can identify static metadata corresponding to software stored on the remote computing device. For example, the static metadata can include an installation time for read-only software, a file size for read-only files, and the like. In some embodiments, the remote computing device can generate the remote check value by applying any suitable cryptographic checksum function to the static metadata and a nonce or a nonce and digital signature. In some embodiments, the remote computing device can generate the remote check value by applying a cryptographic checksum to both stored software and stored random data values in the storage or memory of the remote computing device. For example, the remote computing device can include a storage device that stores the authentic copy of the software and random data values with an available storage capacity of the storage device being below a predetermined threshold. For example, an available space of the storage device that is not used for the authentic copy of software can be filled with random data values up to a predetermined threshold amount or a predetermined capacity of the storage device. In some embodiments, the predetermined threshold can be 5 MB, 10, MB, or the like. In some examples, the remote computing device can generate and store random data values until the available storage space in the storage device is below the predetermined threshold. This technique can prevent the remote computing device from storing unauthorized software.

At block 308, the remote computing device can transmit the remote check value to the secure computing device. For example, the remote computing device can transmit the remote check value to the secure computing device via any suitable CAN bus, LIN bus, network connection, Bluetooth™ connection, computer-readable media, and the like.

In some embodiments, full features of the software are unavailable on the remote computing device until the software of the remote computing device is validated by the secure computing device. In some examples, the remote computing device can receive permission for full operation of software upon confirmation of a correct validation of the software. For example, following validation of software stored on a remote computing device, additional features within the software can be enabled for execution.

It is to be understood that FIG. 3 is an example implementation of techniques described herein and the system 300 can include fewer or additional components and devices in additional implementations. For example, the method 300 can include computing or generating, by the remote computing device, a hash of a nonce value and static code stored on the remote computing device. The hash of the nonce or the nonce itself can be used, in some examples, as an encryption key to encrypt a known plaintext message. In some embodiments, the remote computing device can send the encrypted plaintext message to the secure compute device. If the secure computing device cannot decrypt the encrypted plaintext message, or ciphertext, the method can include determining that the software stored in the remote computing device has been modified to include unauthorized software or instructions.

In some embodiments, the nonce value in a validation request includes a full unique time based on the date (or the number of seconds since a predetermined year, etc). In some examples, the nonce value may not be transmitted to the remote computing device from the secure computing device. For example, the method can include issuing a command by the secure computing device to the remote computing device to provide the check value, then the remote computing device can respond with the check value and the time/date that the verification request is processed by the remote computing device. In some examples, the secure computing device can confirm that the time/date was within an expected range and not a repeat of an old value. In some embodiments, the remote computing device may not be prompted to provide a check value. For example, the remote computing device may periodically output a check value with date/time in a log file, or any other suitable location in a storage device. The check values stored in the log file may be validated at any suitable time by the secure computing device. In some embodiments, the log file may be stored within any suitable external computing device or external storage device and the log file may include check values calculated by the remote computing device at a predetermined time interval, such as 5 seconds, 1 minute, or 5 minutes, among others. In some examples, any remaining available space of the storage device of the remote computing device can be filled with random data values to prevent the storage of precomputed check values. In some examples, if a clock is unavailable, a counter value can be initialized and incremented as a non-transmitted nonce value.

Figure 4:
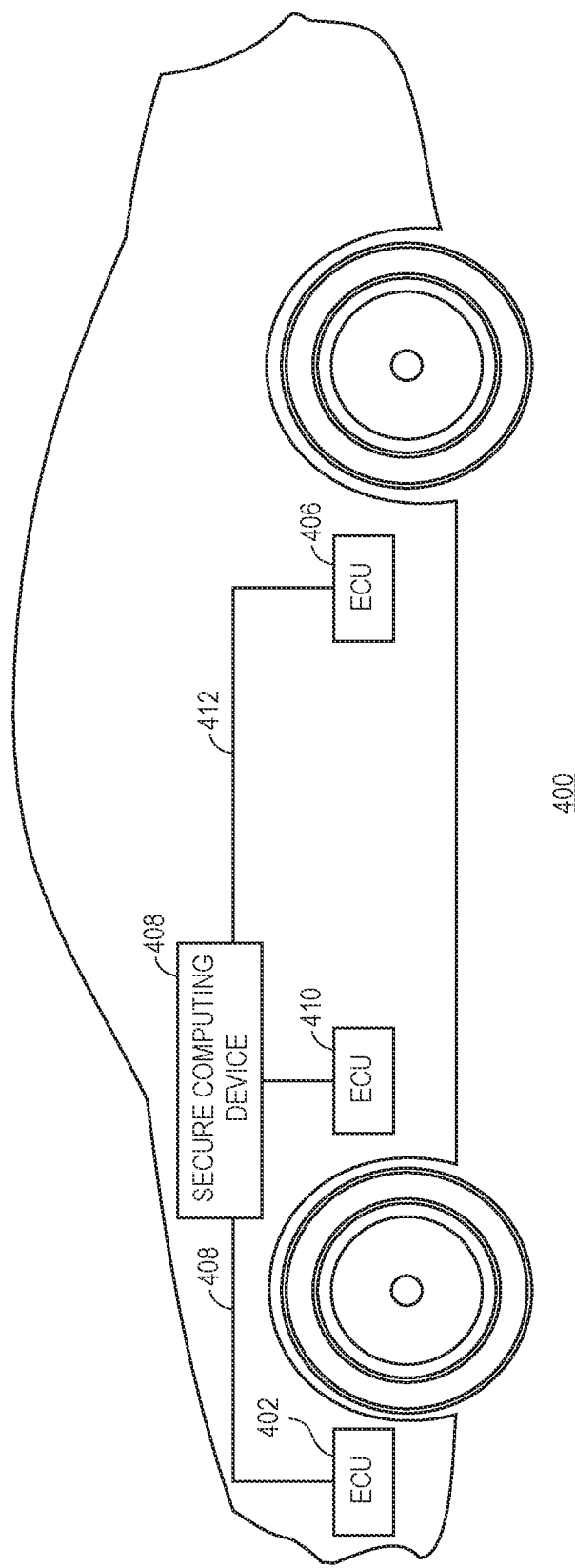
FIG. 4 is a block diagram of an example device comprising electronic control units with software validated by a secure computing device, according to example embodiments described herein.

FIG. 4 is a block diagram of an example vehicle comprising electronic control units with software validated by a secure computing device, according to example embodiments described herein.

In some embodiments, a vehicle 400 can include electronic control units ("ECUs") 402, 404, 406 that are remote computing devices that can be coupled to a secure computing device 408, secure ECU, or any suitable device. In some embodiments, the secure computing device 408 can include a copy of the software stored on each ECU 402, 404, and 406. The copy of the software can include the read-only files, and other static information, stored in each ECU 402, 404, and 406. In some examples, each ECU 402, 404, 406 can calculate, compute, or generate a separate unique remote check value, in response to a validation request, and transmit the separate remote check values to the secure computing device 408 via digital channels 408, 410, and 412. The secure computing device 408 can then verify, based on a random data string or nonce, that the static software stored on each ECU 402, 404, and 406 has not been modified based on the processed described above in relation to FIGS. 3 and 4.

One of ordinary skill will recognize that the components and implementation details shown in FIG. 4 are examples presented for conciseness and clarity of explanation. Other components, processes, implementation details, and variations may be used without departing from the principles of the techniques described herein, as this example is not intended to be limiting and many variations are possible.

Figure 5:
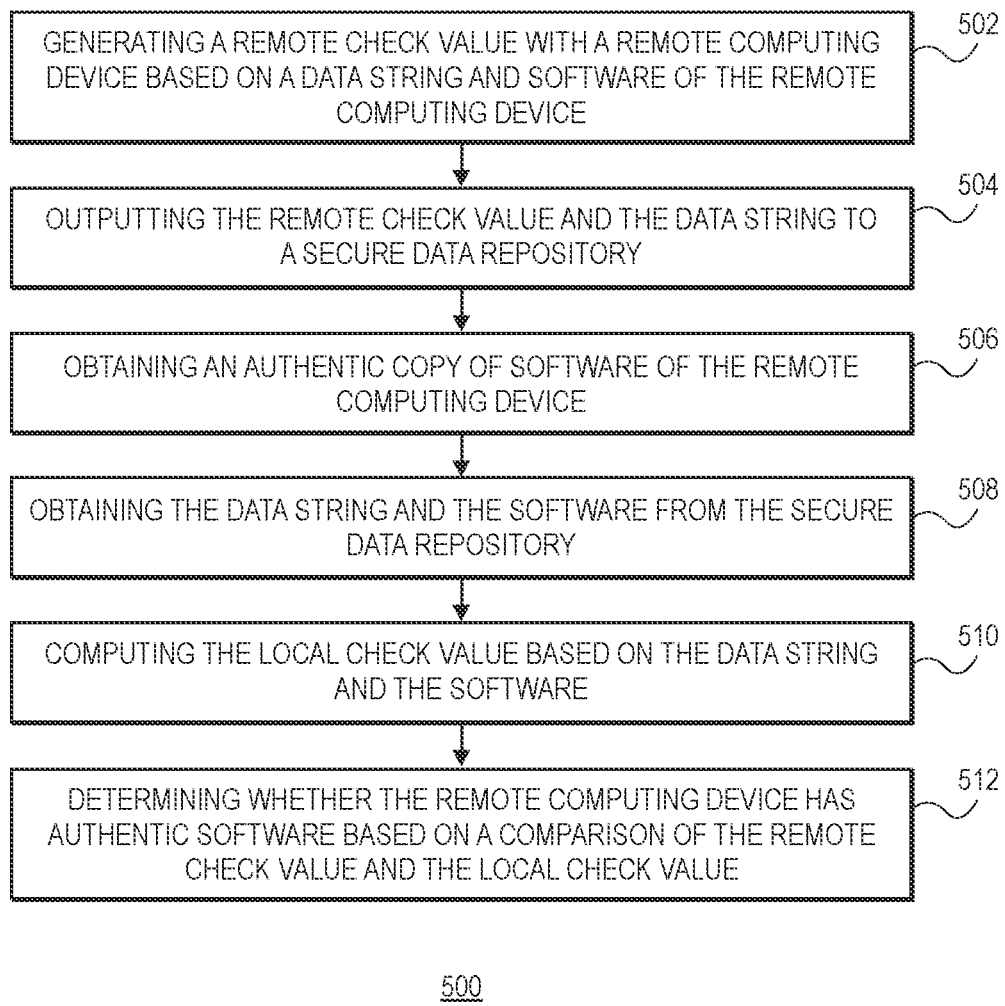
FIG. 5 is a process flow diagram of an example method for a remote computing device to enable validation of software residing on the remote computing device, according to example embodiments described herein.

FIG. 5 is a process flow diagram of an example method for a remote computing device to enable validation of software residing on the remote computing device. The method 500 can be performed with any suitable computing device, such as the remote computing device 104 of FIG. 1 or a vehicle gateway, among others.

At block 502, the remote computing device can calculate, compute, or generate a remote check value based on a data string and software stored on the remote computing device. The data string can be any suitable random value, time stamp, or incrementing counter, among others. In some embodiments, the remote check value is generated based on the static information or read-only information stored in the remote computing device. For example, the remote check value can be generated, as discussed above in relation to block 306 of FIG. 3, by an HMAC function applied to the static information such as binary executables, files, directories, and the like. In some embodiments, the remote check value can be generated based on a hash function applied to the list of static information while disregarding the dynamic information from the cryptographic checksum function calculation. In some embodiments, the remote computing device can generate the remote check value by applying any suitable cryptographic checksum function to the static metadata and the data string. In some examples, generating the remote check value can include calculating the remote check value based on a predetermined time interval such as any number of seconds, minutes, hours, or days, among others.

At block 504, the remote computing device can output the remote check value and the data string from the remote computing device to a secure data repository. For example, the remote computing device can transmit the remote check value to the secure data repository via any suitable CAN bus, LIN bus, network connection, Bluetooth™ connection, computer-readable media, and the like. In some embodiments, the secure data repository can be any suitable storage device, log file, computing device, server, or the like, that can receive and store the remote check value and the data string from the remote computing device.

In some embodiments, the remote computing device can periodically validate software when the secure computing device is unavailable or offline. For example, the remote computing device can validate software stored on the remote computing device without receiving a validation request or command with a nonce value from the secure computing device. In some examples, the secure computing device can asynchronously communicate with the secure data repository to access the remote check value and validate the software of the remote computing device.

At block 506, the secure computing device can obtain a copy of stored software also provided to the remote computing device. In some embodiments, the secure computing device can receive a copy of the software during the initialization process described above in relation to bock 202 of FIG. 2. In some embodiments, the secure computing device can receive the copy of the stored software from a trusted software repository accessible by the secure computing device and the remote computing device. In some examples, the remote computing device and the secure computing device can obtain the copy of the stored software at different times and locations.

At block 508, the secure computing device can obtain the data string and the remote check value from the secure data repository. For example, the secure computing device can access the secure data repository using any suitable digital communication channel to retrieve the data string and the remote check value calculated by the remote computing device.

At block 510, the secure computing device can generate or compute a local check value based on, or using, the authentic copy of the software that is in the remote computing device (from block 508) and the data string. In some embodiments, the secure computing device generates the local check value by using the same algorithm or technique that was used by the remote computing device to generate the remote check value and by using the data string in the same way as the remote computing device used it. In some examples, the secure computing device uses the authentic copy of the software to generate the local check value, while the remote computing device uses its internal copy of the software to generate the remote check value. Under these conditions, if the remote computing device's internal copy of its software is the same as the authentic copy of the software, then the remote check value will be the same as the local check value; otherwise, the two values will differ. In some examples, a hash function applied to the data string and software can be used for the encryption computation without an encryption key.

At block 512, the secure computing device can determine or verify whether or not the remote computing device is executing authentic software based on a comparison of the remote check value and the local check value. For example, in various implementations, the remote check value and the local check value will be the same value if the software residing on the remote computing device is authentic—e.g., has not been altered and is the same as the known-to-be authentic copy of the software obtained by the secure computing at block 506. If the remote check value and the local check value are the same value, then the secure computing device may determine that the remote computing device is indeed executing authentic software, and the secure computing device has no need to perform additional operations, although in some implementations it may save a record of the satisfactory validation. Similarly, the remote check value and the local check value will be different values if the software residing on the remote computing device has been modified, altered, or is otherwise not the same as the as the known-to-be authentic software obtained by the secure computing at block 506.

It is to be understood that FIG. 5 is an example implementation of techniques described herein and the method 500 can include fewer or additional blocks in additional implementations.

Figure 6:
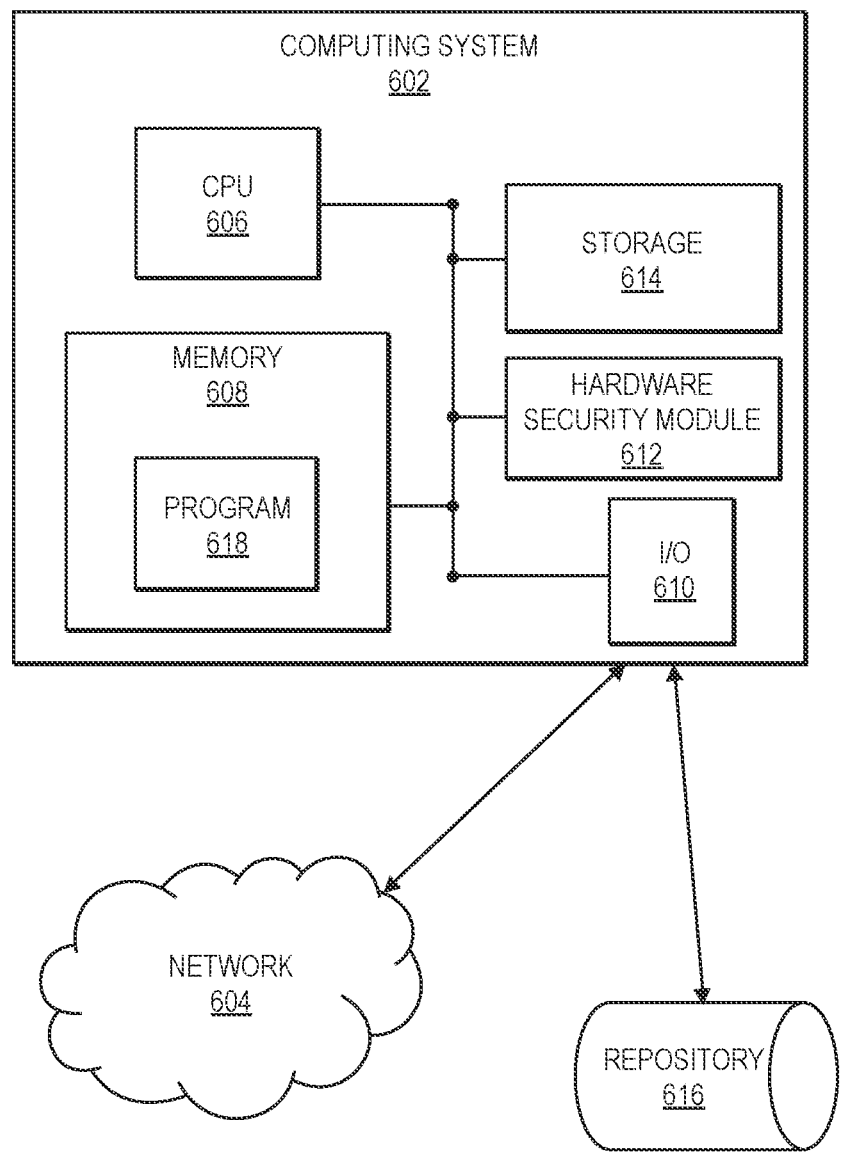
FIG. 6 is a block diagram of an example of a computing system that can host systems and methods consistent with example embodiments described herein.

FIG. 6 is a block diagram of an example of a computing environment 600, which includes a computing system 602 that may be used for implementing systems and methods consistent with implementations of the present techniques. Other components and/or arrangements may also be used. In some implementations, computing system 602 may be used to implement, at least partially, various components of FIGS. 1-5, such as the secure computing device 102, or the remote computing device 104 of FIG. 1, among other things. In some implementations, a series of computing systems similar to computing system 600 may be each customized with specialized hardware and/or programmed as a specialized server to implement one of the components of FIGS. 1-5, which may communicate with each other via a network 504.

In the example shown in FIG. 6, the computing system 600 includes a number of components, such as a central processing unit (CPU) 606, a memory 608, an input/output (I/O) device(s) 610, a hardware security module (HSM) 612, and a nonvolatile storage device 614. System 600 can be implemented in various ways. For example, an implementation as an integrated platform (such as a server, workstation, personal computer, laptop, etc.) may comprise a CPU 606, a memory 608, a nonvolatile storage 614, and I/O devices 610. In such a configuration, the components 606, 608, 614, and 610 may connect and communicate through a local data bus and may access a data repository 616 (implemented, for example, as a separate database system) via an external I/O connection. The I/O component(s) 610 may connect to external devices through a direct communication link (e.g., a hardwired or local Wi-Fi connection), through a network, such as a local area network (LAN) or a wide area network (WAN, such as a cellular telephone network or the Internet), and/or through other suitable connections. System 600 may be standalone or it may be a subsystem of a larger system.

The CPU 606 may be one or more known processor or processing devices, such as a microprocessor from the Core™ family manufactured by the Intel™ Corporation of Santa Clara, Calif., a secure microprocessor that contains an HSM, such as the NXP i.MX8, or a microprocessor from the Athlon™ family manufactured by the AMD™ Corporation of Sunnyvale, Calif. The memory 608 may be one or more fast storage devices configured to store instructions and information executed or used by the CPU 606 to perform certain functions, methods, and processes related to implementations of the present techniques. The storage 614 may be a volatile or non-volatile, magnetic, semiconductor, tape, optical, or other type of storage device or computer-readable medium, including devices such as CDs and DVDs and solid state devices, meant for long-term storage.

In the illustrated implementation, the memory 608 contains one or more programs or applications 618 loaded from the storage 614 that, when executed by the CPU 606, perform various operations, procedures, processes, or methods consistent with the present techniques. Alternatively, the CPU 606 may execute one or more programs located remotely from the system 600. For example, the system 600 may access one or more remote programs via the network 604 that, when executed, perform functions and processes related to implementations of the present techniques.

In one implementation, the memory 608 may include a program(s) 618 for performing the specialized functions and operations described herein for the secure computing device 102 and/or remote computing device 104. In some implementations, the memory 608 may also include other programs or applications that implement other methods and processes that provide ancillary functionality to the present techniques. In some examples, the memory 608 can include any suitable non-transitory computer-readable media. For example, the non-transitory computer-readable media can include computer-executable instructions that direct the CPU 606 to execute instructions according to techniques described herein.

The memory 608 may be also be configured with other programs (not shown) unrelated to the present techniques and/or an operating system (not shown) that performs several functions well known in the art when executed by the CPU 606. By way of example, the operating system may be Microsoft Windows™, Unix™, Linux™' an Apple Computers™ operating system, or other operating system. The choice of operating system, and even the use of an operating system, is not critical to the present techniques.

The HSM 612 may be a device with its own processor that securely generates and stores digital security assets and/or securely performs a variety of cryptographic and sensitive computations. The HSM 612 protects digital security assets, such as cryptographic keys, and other sensitive data from possible access by an attacker. In some implementations, the HSM 612 may be a plug-in card or board that attaches directly to the computing system 600. The HSM 612 can also be integrated into a single chip microprocessor.

The I/O device(s) 610 may comprise one or more input/output devices that allow data to be received and/or transmitted by the system 600. For example, the I/O device 610 may include one or more input devices, such as a keyboard, touch screen, mouse, and the like, that enable data to be input from a user. Further, the I/O device 610 may include one or more output devices, such as a display screen, a CRT monitor, an LCD monitor, a plasma display, a printer, speaker devices, and the like, that enable data to be output or presented to a user. The I/O device 610 may also include one or more digital and/or analog communication input/output devices that allow the computing system 600 to communicate, for example, digitally, with other machines and devices. Other configurations and/or numbers of input and/or output devices may be incorporated in the I/O device 610. In some examples, the I/O device 610 can be implemented on a single chip microprocessor.

In the implementation shown, the system 600 is connected to a network 604 (such as the Internet, a private network, a virtual private network, a cellular network or other network or combination of these), which may in turn be connected to various systems and computing machines, such as servers, personal computers, laptop computers, client devices, etc. In general, the system 600 may input data from external machines and devices and output data to external machines and devices via the network 604.

In the example implementation shown in FIG. 6, the data repository or data source 616 is a standalone database or file system or dedicated memory external to system 600. In other implementations, the data source 616 may be hosted by the system 600. In various implementations, the data source 616 may manage and store data used to implement systems and methods consistent with the present techniques. For example, the data source 616 may be managed by the HSM 612 or the CPU 606 and store data structures that contain the software and/or metadata for each remote computing device 104 validated by the system 100, and the like.

The data source 616 may comprise one or more databases, file systems or other memory banks that store information and are accessed and/or managed through the system 600. By way of example, the database 616 may be an Oracle™ database, a Sybase™ database, or other relational database. Systems and methods consistent with the present techniques, however, are not limited to separate data structures or databases, or even to the use of a database or data structure. In some examples, the data source 616 can include a file system or flat file, among others.

One of ordinary skill will recognize that the components and implementation details of the system in FIG. 6 are examples presented for conciseness and clarity of explanation. Other components and implementation details may be used.

Although the foregoing examples use specific examples of computerized devices, such a OBUs, ECUs, and RSUs, for clarity of explanation, the present techniques are not limited to those specific examples. Various implementations consistent with the present techniques may be used with and for a wide variety of computerized devices, such as medical device (e.g., dialysis machines, infusion pumps, etc.); robots; drones; autonomous vehicles; and wireless communication modules (e.g., embedded Universal Integrated Circuit Cards (eUICC)), among others.

Other implementations of the present techniques will be apparent to those skilled in the art from consideration of the specification and practice of the techniques disclosed herein. Various modifications of the illustrative embodiments, as well as other embodiments of the subject matter that are apparent to persons skilled in the art to which the disclosed subject matter pertains, are deemed to lie within the scope of the disclosed subject matter.

What is claimed is:

1. A computer implemented method for validating software, the method comprising:
   generating a first check value, by a remote computing device, based on a unique value and software of the remote computing device;
   out putting the first check value and the unique value from the remote computing device to a secure data repository;
   obtaining, by a secure computing device, an authentic copy of the software of the remote computing device, wherein the authentic copy is a last known authorized software provided to the remote computing device;
   obtaining, by the secure computing device, the unique value and the first check value from the secure data repository;
   computing, by the secure computing device, a second check value based on the authentic copy of the software for the remote computing device and the unique value;
   determining, by the secure computing device, whether the remote computing device has authentic software based on a comparison of the obtained first check value and the second check value; and providing, by the secure computing device, an instruction modifying operation of the remote computing device in response to a determination that the existing software is not authentic.

2. The method of claim 1, wherein the generating the first check value comprises calculating the first check value based on a predetermined criteria.

3. The method of claim 2, wherein the predetermined criteria comprises one or more of a predetermined time interval calculated from a previous validation time, a random time interval, and a state change of the remote computing device.

4. The method of claim 1,
wherein generating the first check value comprises generating the first check value using at least one of the unique value and an additional input as an encryption key for a cryptographic checksum computation that produces the first check value; and
wherein computing the second check value comprises computing the second check value using at least one of the unique value and the additional input as an encryption key for a cryptographic checksum computation that produces the second check value.

5. The method of claim 1, further comprising:
transmitting, from the remote computing device to the secure computing device, user data; and
wherein generating the first check value comprises generating the first check value based on the unique value, the software, and the user data, and
wherein computing the second check value comprises computing the second check value using the unique value, the authentic copy of the software, and the user data.

6. The method of claim 2, further comprising storing metadata in a memory of the secure computing device, the metadata comprising the predetermined criteria.

7. The method of claim 1, wherein the generating of the first check value comprises generating the first check value based on the unique value, the software, and static data stored in a memory of the remote computing device.

8. The method of claim 7, wherein the static data comprises at least one of one or more binary executable files, one or more data files, and one or more directories.

9. The method of claim 7, wherein the first check value is generated based on a hash-based message authentication code ("HMAC") or a Cipher-based Message Authentication Code ("CMAC") function applied to the static data, wherein dynamic data of the remote computing device is excluded.

10. The method of claim 1, further comprising:
receiving, by the remote computing device, a validation request from the secure computing device,
wherein the receiving occurs prior to the generating of the first check value.

11. The method of claim 10, comprising:
detecting, by the secure computing device, that the remote computing device has transitioned from a lower powered state to a higher powered state; and
transmitting, by the secure computing device, the validation request following the detection.

12. The method of claim 10, wherein the validation request is received at a random time selected within a predetermined number of hours of the day.

13. The method of claim 1, wherein the outputting the first check value and the unique value and the obtaining the unique value and the first check value from the secure data repository are performed over an unsecured digital channel.

14. The method of claim 1, wherein the modifying comprises at least one of disabling or partially disabling the remote computing device, and correcting or recovering the software in the remote computing device.

15. The method of claim 1, wherein the unique value comprises at least one of a data string or a nonce.

16. A computer implemented method for validating existing software of a remote computing device by a secure computing device, the method comprising:
receiving, by the remote computing device a software validation request comprising a unique value, from the secure computing device;
generating, by the remote computing device a first check value based on a unique value and existing software installed on the remote computing device;
providing the first check value to a secure data repository;
obtaining, by the secure computing device, an authentic copy of the software installed on the remote computing device, wherein the authentic copy is a last known authorized software provided to the remote computing device;
obtaining, by the secure computing device the first check value from the secure data repository;
computing, by the secure computing device, a second check value based on the authentic copy of the software and the unique value;
determining, by the secure computing device, whether the existing software of the remote computing device is valid based on a comparison of the obtained first check value and the second check value; and
providing, by the secure computing device, an instruction modifying operation of the remote computing device in response to a determination that the existing software is not valid.

17. The method of claim 16, wherein the modifying comprises one or more of disabling or partially disabling the remote computing device, correcting or recovering the existing software in the remote computing device, preventing data transfer from the remote computing device, and sending an alert from the remote computing device.

18. The method of claim 16, wherein the software validation request indicates a time limit for generation of the first check value by the remote computing device.

19. The method of claim 16, wherein the secure computing device stores information related to an estimated time for generating of the first check value by the remote computing device, and wherein, if an actual time for generation of the first check value deviates by greater than a predetermined threshold from the estimated time, the existing software is determined as not valid regardless of the comparison of the obtained first check value and the second check value.

20. The method of claim 16, wherein the validation request is received immediately following at least one of a detection that the remote computing device has transitioned from a lower powered state to a higher powered state, expiration of a randomly determined time period, and expiration of a non-random predetermined interval since receipt of a previous validation request.

21. The method according to claim 16, wherein the unique value comprises at least one of a data string or a nonce.

22. A system for validating software, the system comprising:
a secure data repository configured to store a unique value and a remotely generated check value, wherein the remotely generated check value is generated by a remote computing device based on the unique value and software of the remote computing device;

a trusted software repository configured to store an authentic copy of the software of the remote computing device, wherein the authentic copy is a last known authorized software provided to the remote computing device; and a secure computing device in communication with the secure data repository and the trusted software repository, wherein the secure computing device is configured to:

obtain the authentic copy of the software of the remote computing device;

obtain the unique value and the first check value from the secure data repository;

compute a second check value based on the authentic copy of the software of the remote computing device and the unique value;

determine whether the remote computing device has authentic software based on a comparison of the obtained first check value and the second check value; and providing, by the secure computing device, an instruction modifying operation of the remote computing device in response to a determination that the existing software is not authentic.

23. The system according to claim 22, wherein the unique value comprises at least one of a data string or a nonce.

* * * * *